US011190372B2

(12) United States Patent
Muth et al.

(10) Patent No.: US 11,190,372 B2
(45) Date of Patent: Nov. 30, 2021

(54) DIFFERENTIAL BUS NETWORK

(71) Applicant: NXP B.V., Eindhoven (NL)

(72) Inventors: Matthias Berthold Muth, Stelle (DE);
Clemens Gerhardus Johannes de Haas, Ewijk (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 17/248,770

(22) Filed: Feb. 5, 2021

(65) Prior Publication Data

US 2021/0258185 A1  Aug. 19, 2021

(30) Foreign Application Priority Data

Feb. 14, 2020 (EP) .................... 20157442

(51) Int. Cl.
*H04L 12/40* (2006.01)
*H04L 25/08* (2006.01)

(52) U.S. Cl.
CPC .. *H04L 12/40013* (2013.01); *H04L 12/40032* (2013.01); *H04L 12/40039* (2013.01); *H04L 25/085* (2013.01); *H04L 2012/40215* (2013.01)

(58) Field of Classification Search
CPC ......... H04L 12/40013; H04L 12/40032; H04L 12/40039; H04L 25/085
See application file for complete search history.

(56) References Cited

U.S. PATENT DOCUMENTS 6,587,968 B1 7/2003 Leyva
8,593,202 B2 11/2013 Mori et al.
9,178,764 B2 11/2015 Hartwich et al.
9,973,348 B2 5/2018 Mounier et al.
10,020,841 B2 7/2018 De Haas et al.
10,042,807 B2 * 8/2018 Hinderer ............. G06F 13/4282
10,089,274 B2 * 10/2018 Biskup ................ G06F 13/4022
10,791,002 B2 9/2020 De Haas et al.
(Continued)

FOREIGN PATENT DOCUMENTS

DE   10 2011 005088 A1   9/2011

OTHER PUBLICATIONS

Texas Instruments, Comparing Bus Solutions, 2017 (Year: 2107).*
NXP, Tutorial Introduction, 2014 (Year: 2014).*

*Primary Examiner* — Henry Tsai
*Assistant Examiner* — Christopher A Daley

(57) ABSTRACT

A differential bus network comprising: a bus comprising two bus wires; at least three nodes each comprising: a transceiver comprising: bus terminals for coupling, respectively, to the two wires of the bus; a receiver arrangement configured to receive differential signalling from the bus terminals and determine a digital receive signal based on said differential signalling; and a transmitter arrangement configured to apply differential signalling to the bus terminals based on a digital transmit signal, the transmitter arrangement comprising a first transmitter configured to increase the potential difference between the wires of the bus to a first differential voltage state and maintain the first differential state and a suppression element configured to decrease the potential difference between the two wires of the bus towards a second differential voltage state, the transmitter arrangement further comprising a resistor coupled between the bus terminals configured to at least maintain the second differential voltage state.

15 Claims, 3 Drawing Sheets

(56) References Cited

U.S. PATENT DOCUMENTS

| | | |
|---|---|---|
| 10,880,117 B2 * | 12/2020 | Aarey Premanath ........................ H04L 12/40013 |
| 11,038,508 B2 * | 6/2021 | de Haas .............. H04L 25/0272 |
| 2013/0322463 A1 | 12/2013 | Hartwich et al. |
| 2014/0156893 A1 | 6/2014 | Monroe et al. |
| 2017/0262394 A1 | 9/2017 | De Haas et al. |
| 2018/0260353 A1 | 9/2018 | De Haas et al. |
| 2019/0288680 A1 | 9/2019 | Sekiya et al. |

* cited by examiner

DIFFERENTIAL BUS NETWORK

CROSS-REFERENCE TO RELATED APPLICATIONS

This application claims the priority under 35 U.S.C. § 119 of European patent application no. 20157442.3, filed on Feb. 14, 2020, the contents of which are incorporated by reference herein.

FIELD

The present disclosure relates to a differential bus network. It also relates to a common transceiver design for use in all nodes coupled to the differential bus network. It also relates to a kit of parts for forming the differential bus network and a method.

BACKGROUND

Communication bus based networks that comprise a pair of wires may require a particular resistance between the wires to enable differential signalling to be effectively provided over the bus wires.

SUMMARY

According to a first aspect of the present disclosure there is provided a differential bus network comprising:
a bus comprising at least two bus wires;
at least three nodes, wherein each of the at least three nodes comprise:
  a transceiver comprising:
    bus terminals for coupling, respectively, to the at least two wires of the bus;
    a receiver arrangement configured to receive differential signalling from the bus terminals and determine a digital receive signal based on said differential signalling; and
    a transmitter arrangement configured to apply differential signalling to the bus terminals based on a digital transmit signal, the transmitter arrangement comprising a first transmitter configured to increase the potential difference between the at least two wires of the bus to a first differential voltage state and maintain the first differential state and a suppression element configured to decrease the potential difference between the at least two wires of the bus towards a second differential voltage state, the transmitter arrangement further comprising a resistor coupled between the bus terminals configured to at least maintain the second differential voltage state.

Thus, in one or more examples, the resistor coupled between the bus terminals in each of the nodes is configured to perform the function of a termination resistor at each end of the differential bus as defined by the CAN protocol in that it drains energy from the bus wires to enable the provision of the second differential voltage state from the first differential state in combination with the second transmitter element. Accordingly, the differential bus network is absent a dedicated pair of nodes containing termination resistors that couple the at least two bus wires together. Accordingly, the at least two wires of the bus of the differential bus network may be uncoupled except at the nodes.

In one or more embodiments, the bus comprises a Controller Area Network, CAN, bus and wherein the transceiver of each of said at least three nodes is configured to provide the digital receive signal to, and receive the digital transmit signal from, a CAN protocol controller.

In one or more examples, the differential bus network comprises a FlexRay differential bus network configured to operate, at least in part, in accordance with the FlexRay protocol.

In one or more embodiments, the resistor comprises a discrete resistor coupled between the bus terminals downstream of the transmitter arrangement and upstream of the receiver arrangement.

In one or more embodiments, the first differential state comprises the provision of a potential difference between the at least two bus wires greater than a threshold voltage to signal a bit of the digital transmit signal of a first logic level, and the second differential state comprises the provision of a substantially zero potential difference between the at least two bus wires that is less than said threshold voltage to signal a bit of a second logic level, different to the first logic level.

In one or more embodiments, the transceiver is configured to provide said differential signalling representing the first logic level by activating the first transmitter and configured to provide said differential signalling representing the second logic level by, in part, deactivating the first transmitter.

In one or more embodiments, the transceiver includes a suppression controller configured to receive the digital transmit signal and configured to, on detection of a transition between the first logic level and the second logic level in the digital transmit signal, that requires the transition from the first differential state to the second differential state, activate the suppression element for a predetermined time.

In one or more examples, at the end of the predetermined time, the suppression controller is configured to deactivate the suppression element, such as until the next transition between logic states in the digital transmit signal that requires the transition from the first differential state to the second differential state.

In one or more embodiments, the suppression element is configured to decrease the potential difference between the at least two wires of the bus towards the second differential voltage state by application of a potential difference to the at least two bus wires of an opposite polarity to that applied by the first transmitter to achieve the first differential voltage state, the transmitter arrangement configured to disable the suppression element when the second differential state is reached.

In one or more examples, the disabling of the second transmitter may be based on detection of the second differential state being reached. Accordingly, a sensor may be provided to sense the potential difference between the at least two bus wires.

In one or more embodiments, each node include a controller that includes a CAN protocol controller to implement a CAN-based protocol in the network, the controller coupled to the transceiver by at least a first connection to provide the digital transmit signal to the transceiver and a second connection to receive the digital receive signal from the transceiver.

In one or more embodiments, the resistor has a resistance, in Ohms, of at least 50 times the number of at least three nodes. In one or more examples, the resistor may have a resistance greater than 45 or greater than 50 times a maximum number of nodes that the bus of the network is configured to couple to. In one or more examples, the resistor may have a resistance greater than 50 Ohms, or greater than 100 Ohms or greater than 200 Ohms or greater than 1000 Ohms. In one or more examples, the configuration of the differential bus network is defined by a protocol and wherein the protocol defines a minimum impedance of the bus and wherein the resistor may have a resistance greater than the minimum impedance of the bus multiplied by one of the number of at least three nodes or a maximum number of nodes that the bus of the network is configured to couple to.

In one or more embodiments, the network comprises only said at least three nodes.

In one or more embodiments, the bus comprises two wires.

According to a second aspect of the disclosure there is provided a kit of parts for forming a differential bus network, the kit comprising:
 a bus comprising at least two bus wires;
 at least three nodes, wherein each of the at least three nodes comprise:
  bus terminals for coupling, respectively, to the at least two wires of the bus;
  a transceiver comprising:
   a receiver arrangement configured to receive differential signalling from the bus terminals and determine a digital receive signal based on said differential signalling; and
   a transmitter arrangement configured to apply differential signalling to the bus terminals based on a digital transmit signal, the transmitter arrangement comprising a first transmitter element configured to increase the potential difference between the at least two wires of the bus to a first differential voltage state and maintain the first differential state and a second transmitter configured to decrease the potential difference between the at least two wires of the bus towards a second differential voltage state, the transmitter arrangement further comprising a resistor coupled between the bus terminals configured to at least maintain the second differential voltage state.

According to a third aspect of the disclosure there is provided method of forming a differential bus network, the method comprising:
 providing a bus comprising at least two bus wires;
 coupling at least three nodes to said bus, wherein each of the at least three nodes has bus terminals for coupling, respectively, to the at least two wires of the bus and a common transceiver design in terms of the transceiver comprising:
 a receiver arrangement configured to receive differential signalling from the bus terminals and determine a digital receive signal based on said differential signalling; and
 a transmitter arrangement configured to apply differential signalling to the bus terminals based on a digital transmit signal, the transmitter arrangement comprising a first transmitter element configured to increase the potential difference between the at least two wires of the bus to a first differential voltage state and maintain the first differential state and a second transmitter configured to decrease the potential difference between the at least two wires of the bus towards a second differential voltage state, the transmitter arrangement further comprising a resistor coupled between the bus terminals configured to at least maintain the second differential voltage state.

In one or more embodiments, the method comprises coupling a respective controller to one or more of the transceivers of the at least three nodes, each respective controller configured to provide said digital transmit signal to the transceiver and receive the digital receive signal from the transceiver.

According to a fourth aspect of the disclosure there is provided an electronic device including the differential bus network of the first aspect.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which.

DETAILED DESCRIPTION

A differential bus network comprises a network in which nodes of the network are coupled by a common physical medium comprising the bus. The bus provides the medium through which the nodes can communicate. In the case of a differential bus, the bus typically comprises two conductors or wires, such as a twisted pair cable. Signalling on the bus is provided by applying a first voltage to one of the wires while applying a second voltage of typically opposite polarity to the other wire. The data is represented by the difference in voltage between wires of the bus and, accordingly, said signalling is known as differential signalling. Such a differential signal is used to avoid electromagnetic emissions to the environment. If both bus lines are carrying the same signal shapes, but with opposite polarities, the electromagnetic fields of both wires are compensating each other in an ideal way resulting in no emissions to the environment, and any interference absorbed by the wires is typically is absorbed by both wires such that the interference is cancelled out when the voltage difference between the wires is determined.

Figure 1:
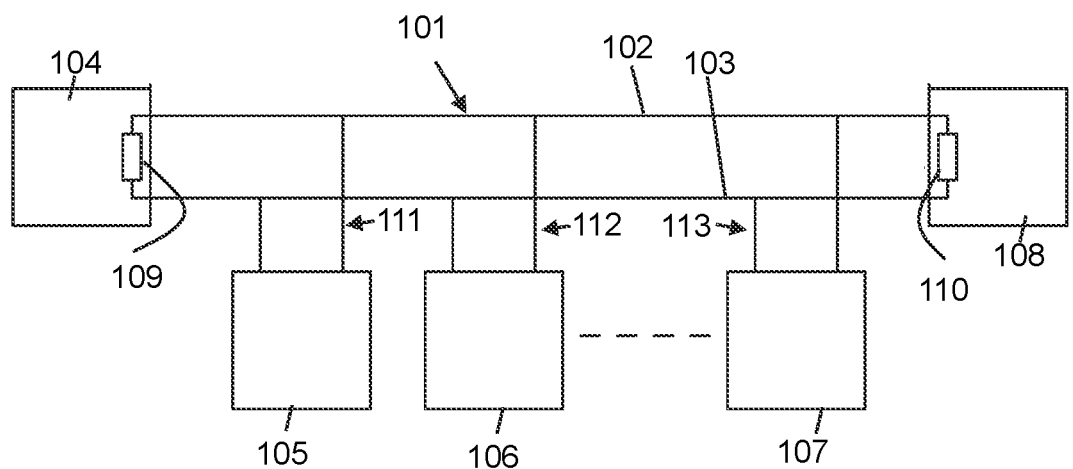
FIG. 1 shows an example differential bus network comprising a controller area network.

A common differential bus network comprises a controller area network (CAN) or FlexRay network. Example FIG. 1 shows an example CAN network. The bus is often used in automotive and industrial automation applications. The CAN bus standard is described in the ISO 11898 standard. A CAN bus can support bit-rates rates up to 1 Mb/s in case of classic CAN, and up to 5 Mbps or 8 Mbps in case of CAN FD (defined in ISO11898-2:2016) when the network topology is correctly terminated.

FIG. 1 shows a CAN bus 101 comprising a first wire 102 and a second wire 103. The network comprises a plurality of nodes, shown as n nodes comprising first node 104, a second node 105, a third node 106, a n–1$^{th}$ node 107 and a n$^{th}$ node. Each node is coupled to both the first wire 102, known as the CANH wire, and the second wire 103, known as the CANL wire to provide the differential signalling to the bus and receive differential signalling from the bus.

The CAN standard requires the bus wires 102, 103 to be terminated at each end of the bus by coupling the CANH and CANL wires 102, 103 together via a termination resistor 109, 110. The terminations are shown at the first node 104 and the n$^{th}$ node 108. The termination resistor typically comprises 120 Ohms since they represent the typical wire impedance of a twisted pair cable and, as such, are "terminating" the most distant ends of the cable with the typical impedance to avoid signal reflections. A consequence is that these two end nodes 104, 108 are "specially equipped" nodes different to the other network nodes because they carry the 120 Ohms termination resistors inside.

The theoretical speed of a CAN network can only be met if the proper termination resistance (120 Ohm) is present at the end-nodes 104, 108 and the nodes without termination resistors are connected to the main cable via short stubs 111, 112, 113 that connect the node to the main length of cable of the bus 101. The stubs in general need to be short to avoid long lasting reflections from open cable ends.

Figure 2:
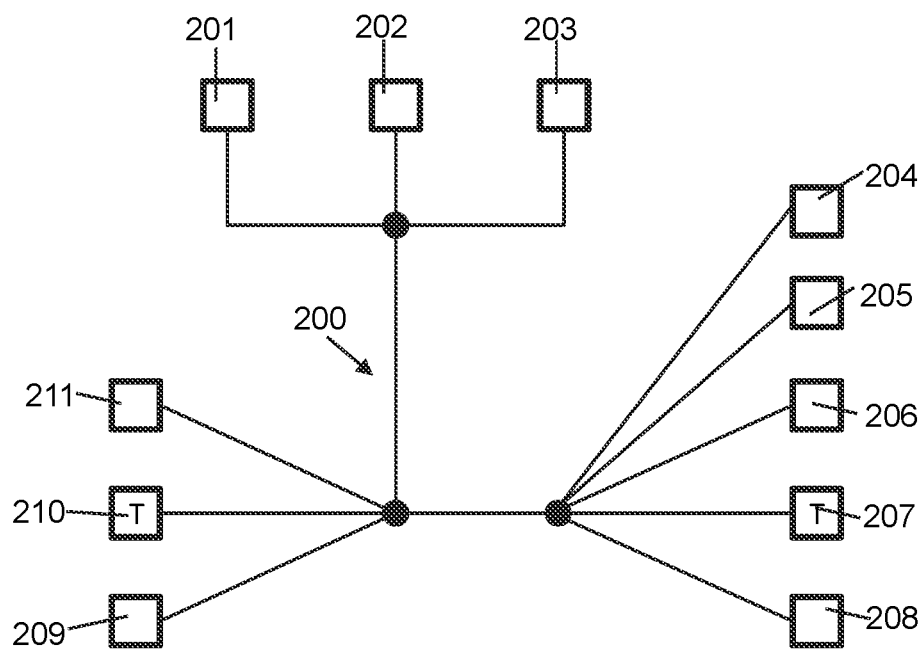
FIG. 2 shows a practical example of a differential bus network comprising a controller area network.

Example FIG. 2 shows an example CAN network 200 comprising a two wire bus (shown as a single line in this example) in a real-world implementation having nodes 201-211. While in the CAN network of FIG. 1 the end-nodes were readily identifiable, in the example of FIG. 2, the presence of numerous branches and long and short stubs make the ends less identifiable. In this example, nodes 207 and 210 are designated the terminating nodes and therefore include the termination resistors that couple the two wires of the bus together.

When any of the nodes 201-211 start sending data, reflections in the network 200 will cause signal disturbances which depend on the physical position of the sending node relative to the termination resistors at nodes 207, 210 and the cable branches. The use of proper bus termination resistors can only avoid signal reflections in an ideal condition, which is a true point to point connection of two nodes at the bus ends or, as an approximation, a very linear bus having more nodes but with very short stubs, similar to as shown in FIG. 1.

As can be appreciated from comparing FIG. 1 and FIG. 2, there are many more nodes connected within real systems and there is no obvious beginning or end of an ideal cable in such a topology anymore. As such, it is questionable where to place the terminating resistors 109, 110, which are required according to current CAN standard.

The terminating resistors typically perform two functions. They reduce signal reflections and are used to drain the energy of the bus when there is a transition between differential signaling that creates a high potential difference between the bus wires and differential signaling that requires a lower or zero potential difference between the bus wires. The termination resistors are therefore required to drain energy out of the bus within a reasonable time to ensure the different states represented by the signaling are discernable from each other within a reasonable time before the transition to the next differential signalling bit.

Each node 104-108 typically comprises a transceiver and a controller. The transceiver is a device which includes a transmitter arrangement and a receiver arrangement. The transmitter arrangement typically converts a digital transmit data stream into a differential analog signal which can be transported through the bus. The receiver arrangement is configured to convert the differential analogue signal back towards a digital receive data stream. The digital transmit data is received by the transceiver from the associated controller. The digital receive data is passed to the controller by the receiver arrangement of the transceiver. The controller may include a protocol controller which implements the rules of the protocol to send and receive data between the nodes.

Figure 3:
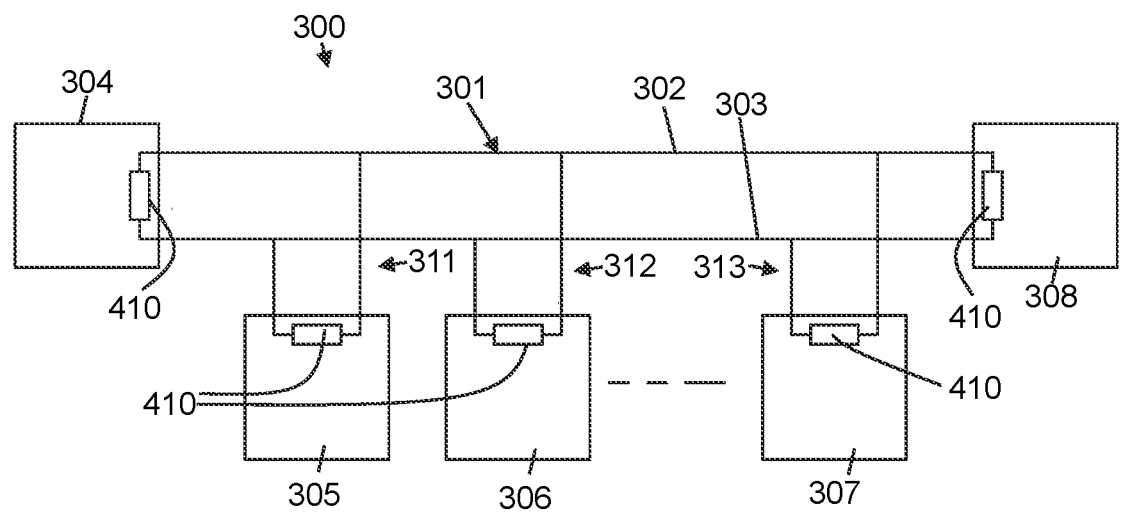
FIG. 3 shows an example embodiment of a differential bus network according to the disclosure.

Example FIG. 3 shows an example differential bus network 300 in accordance with an embodiment of the disclosure. Example FIG. 3 shows a differential bus network 300 comprising a bus 301 having at least two bus wires 302, 303. In the differential bus network 300 of the disclosure, each of the nodes 304-308 in the network has a common transceiver design in terms of the presence a resistor that couples the bus wires 302, 303 together. The use of a common transceiver design in a differential bus network may be advantageous in some examples.

As an implementation of the concept, the network 300 comprises at least three nodes and, in particular, n nodes 304-308 in this example where n≥3. Thus, the example network 300 comprises only said at least three nodes, such that the only nodes in the network are those that have the common transceiver design. With reference to example FIGS. 3 and 4, each of the at least three nodes 304-308 comprise a common transceiver design in terms of comprising bus terminals 402, 403 for coupling, respectively, to the at least two wires 302, 303 of the bus 301. The transceiver of each of the nodes is further common in terms of comprising a receiver arrangement 404 configured to receive differential signalling from the bus terminals 402, 403 and determine a digital receive signal based on said differential signalling. The digital receive signal may be provided to a controller (not shown) via a receive output 405. The transceiver 400 further comprises a transmitter arrangement 406 configured to apply differential signalling to the bus terminals 402, 403 based on a digital transmit signal, which may be received from a transmit input 407 from a controller (not shown).

In the example, the transmitter arrangement 406 comprises a first transmitter 408 configured to increase the potential difference between the at least two wires 302, 303 of the bus to a first differential voltage state and maintain the first differential state. The transmitter arrangement further comprises a suppression element 409 configured to decrease the potential difference between the at least two wires 302, 303 of the bus towards a second differential voltage state. The suppression element 409 may be considered to comprise a dynamic "termination" resistor because it may be configured to be selectively activated to decrease the potential difference between the wires of the bus. The transmitter arrangement 406 further comprises said resistor coupled between the bus terminals 402, 403 and configured to at least maintain the second differential voltage state. The use of a suppression element 409 to actively drive the potential difference of the bus towards the second differential voltage state may provide for a sharper transition (i.e. transition at a greater rate) between the first differential voltage state and the second differential voltage state. The suppression element 409 may be switchable so that it can be activated when the signalling needs to adopt the second differential voltage state from the first differential voltage state. The resistor 410 may act to drain any remaining energy or other voltage disturbances from the bus wires to maintain the second differential voltage state.

Thus, in one or more examples, the resistor 410 coupled between the bus terminals in each of the nodes is configured to perform the function of a termination resistor at each end of the differential bus as defined by the CAN protocol in that it drains energy from the bus wires to enable the provision of the second differential voltage state from the first differential state in combination with the suppression element 409. Thus, the suppression element, when activated, may be considered to promote the decrease in the voltage difference between the bus wires 302, 303 and once the suppression element is deactivated the resistor of each transceiver will continue to act to drain any energy in the bus to maintain the second differential level. Accordingly, the differential bus network is absent a dedicated pair of nodes containing termination resistors that couple the at least two bus wires together. Accordingly, the at least two wires 302, 303 of the bus of the differential bus network may be uncoupled except at the nodes 304-308 where they are coupled by the resistor 410.

The provision of a CAN transceiver of such a design may, in one or more examples, obviate a system designer from having to place two termination resistors in selected nodes (i.e. those at opposite ends of the bus), which make these nodes "special nodes". In practice, the position of the special nodes may be physically located at not ideal locations from a bus cable topology point of view. This places design restrictions on the system designer.

Further, when a network (as illustrated in FIG. 1) requires the so-called special nodes, it is more difficult to use a standard node design in different networks because on one network the node may need to include the termination resistors 109, 110 but in the other network it may not. That results in node variants, which adds cost.

A broken bus wire near one of the nodes 104, 108 could lead to a loss of one of the termination resistors 109, 110. This will change the bus impedance drastically and with that the overall bus communication between any of the nodes is jeopardised by just a single bus fault.

The provision of a common transceiver design which includes a resistor between the bus terminals may, in one or more examples, be advantageous.

The resistor therefore provides a resistance irrespective of the operational state of the transmitter arrangement or receiver arrangement to drain energy from the bus wires.

Since the suppression element transmitter 409 acts like a dynamic termination resistance to suppress ringing in the bus, the passive resistor 410 of all nodes 304-308 in parallel may be allowed to be higher than the specified maximum DC bus resistance of 65 Ohms in the ISO 11898-2 standard but it may be desirable that the resistance should not become lower than the specified minimum DC bus resistance of 50 Ohm. Accordingly, where n is the maximum number of network nodes coupled to the communication bus the value of resistor 410 may be greater than (50Ω×n). As an example, a practical CAN network in an automotive setting assumes a maximum number of nodes of 32. This would result in resistor 410 having a minimum resistance of 50*32=1.6 kOhms. As a further example, if the exact number of nodes, n, in the network is fixed then the resistance of resistor 410 may be x*n, where x is between 50 and 70Ω and optionally 60Ω.

Figure 6:
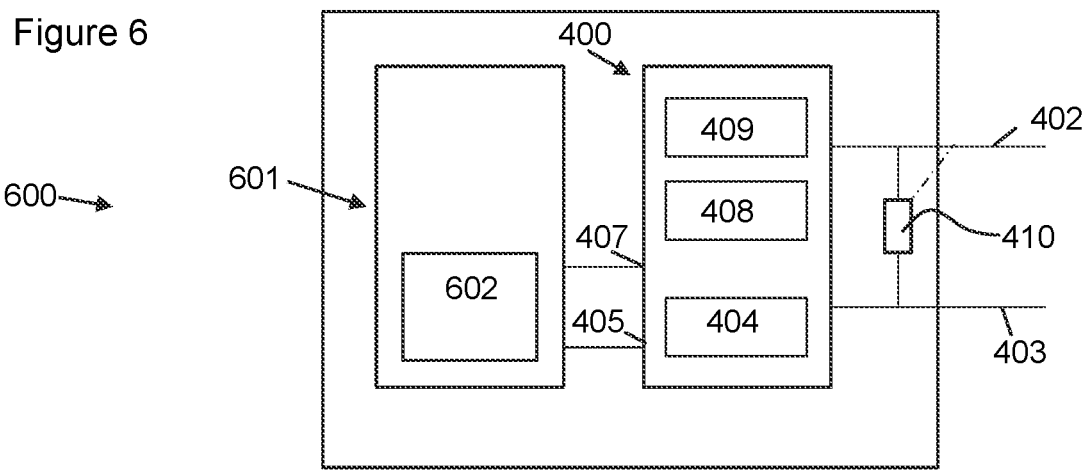
FIG. 6 shows a node of the network including the transceiver and a controller coupled therewith.

In one or more examples, the bus 301 comprises a Controller Area Network, CAN, bus and wherein the transceiver 400 of each of said at least three nodes is configured to provide the digital receive signal to, and receive the digital transmit signal from, a CAN protocol controller 601 (shown in FIG. 6). While the examples herein relate to a CAN bus network, in other examples, the differential bus network may comprise a FlexRay differential bus network configured to operate, at least in part, in accordance with the FlexRay protocol.

Figure 4:
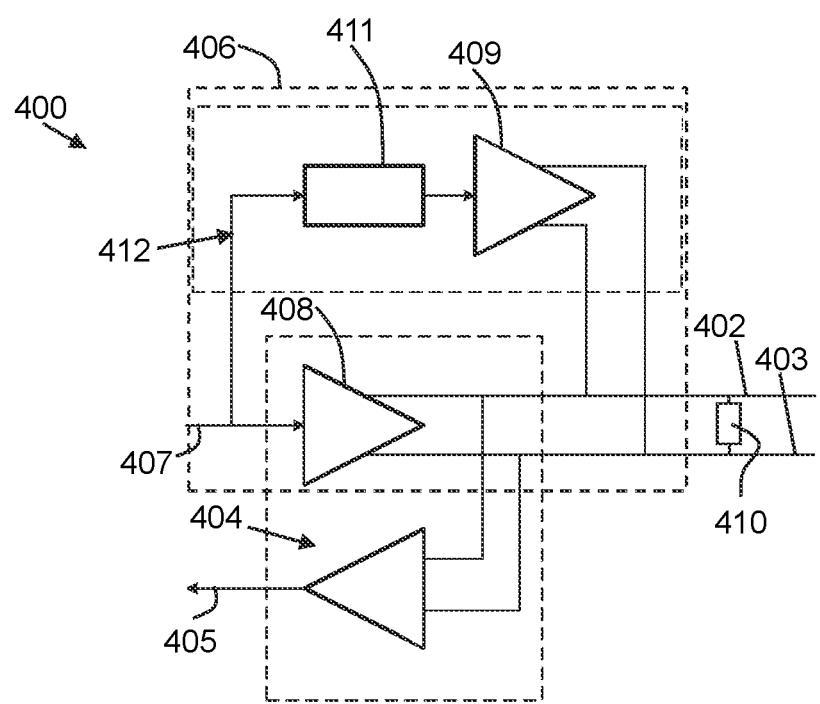
FIG. 4 shows a transceiver of one of the nodes of the embodiment of the differential bus network.

In this and other examples, the resistor 410 comprises a discrete resistor coupled between the bus terminals 402, 403 downstream of the transmitter arrangement 406, i.e. on the output side of the transmitter arrangement 406, and upstream of the receiver arrangement 404, i.e. on the input side of the receiver arrangement 404. It will be appreciated that the resistor 410 may or may not be physically coupled to the bus terminals and may be spaced from the bus terminals that coupled to the bus wires. For example, and as shown in FIG. 4, the terminal ends of the bus terminals 402, 403 are spaced from where the resistor 410 couples the bus terminals together. In some examples, the resistor 410 may be readily removable so that its value can be changed to suit the number of nodes to be installed in the network. Accordingly, the resistor may be configured to snap into a holder in which it couples the bus terminals. In other examples, the transceiver 400 may include a connector to removably connect the resistor to the bus terminals 402, 403.

Figure 5:
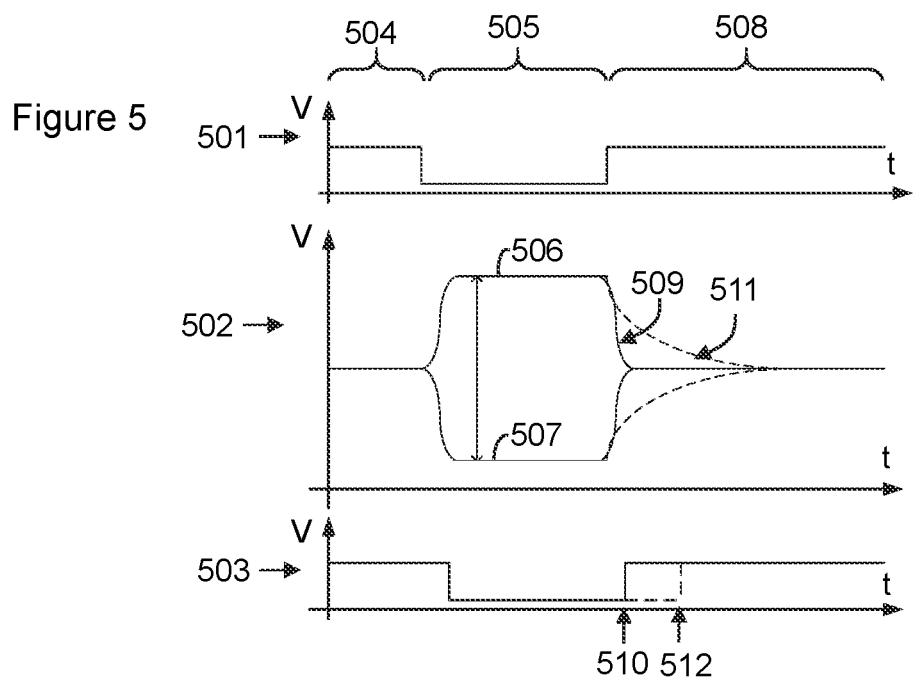
FIG. 5 shows a timing diagram illustrating the voltage on the bus wires in response to the differential signalling applied thereto based on the digital transmit signal.

Examples FIG. 5 shows a timing diagram illustrating the voltage of the transmit signal over time at 501. The differential bus voltage on the two bus wires over time is shown at 502. The digital receive signal that may be derived from the differential signalling at 502 is shown at 503. The dashed lines show the signals without use of the suppression element 409 and the solid lines show the signals with the use of the suppression element 409.

During the period 504, the digital transmit signal is logic high. In this example, logic high is represented by the second differential state and therefore the differential signalling at 502 provides a zero potential difference between the first wire and second wire of the bus, shown by the lines being together and therefore appearing as one line. The digital receive signal is shown as detecting a logic high state because the differential signal is below a threshold used by the receiver arrangement to distinguish between the first and second differential states. At period 505, the digital transmit signal is logic low. In this example, logic low is represented by the first differential state and therefore the first transmitter 408 drives the bus wires to provide differential signalling at 502 that provides a non-zero potential difference between the first wire and second wire of the bus. This is shown by the lines 506 and 507 being separate illustrating the difference between the voltages on the wires. Line 506 shows the potential of the CANH wire and line 507 shows the potential of the CANL wire. The first transmitter 408 drives the bus wires to the first differential state relatively quickly, and the receiver arrangement shows the detection of a logic low state in trace 503 as soon as the threshold (or a second threshold) used by the receiver to distinguish between the first and second differential states is passed.

During the period 508, the digital transmit signal is logic high and therefore the differential signalling is required to transition from the first differential state to the second differential state, which comprises a decrease in the potential difference between the wires of the bus. The suppression element 409 acts to actively drive the bus wires to the lower potential difference and therefore the line 509 shows a relatively quick change from the first differential state to the second differential state. The transmitter 409 (or suppression element more generally) may be considered to act like a dynamic termination resistor while driving the bus voltage to the recessive or second differential state. The digital receive signal in trace 503 is shown to detect that the differential signalling indicates the logic high state at time 510. Dashed line 511 shows the change in the differential signalling from the first differential state to the second differential state when the suppression element is not used, such as in the network of FIG. 1, in which the terminating resistors 109, 110 instead provide for the draining of energy from the bus wires. It will be appreciated that it takes much longer for the potential difference between the bus wires to decrease to the second differential state and, accordingly, the receiver arrangement detects that the differential signalling indicates the logic high state at later time 512. Accordingly, the use of a suppression element 409 and the common resistor 410 may provide a node that is able to communicate more effectively.

In summary, the first differential state may comprise the provision of a potential difference between the at least two bus wires shown by trace 502 at time 505. The potential difference is greater than a threshold voltage and it therefore signals a bit of the digital transmit signal of a first logic level comprising logic low. The second differential state may comprise the provision of a smaller potential difference, which in this example is a substantially zero potential difference between the at least two bus wires. The potential difference is less than said threshold voltage and it signals a bit of a second logic level, comprising the logic high level.

Returning to FIG. 4, the transmitter arrangement 406 may include a suppression controller 411 coupled with the suppression element 409. The suppression controller 411 may be configured to activate the suppression element 409 (from a deactivated or low-power state) based on when the differential signalling is required to transition from the first differential state to the second differential state. In one or more examples, the suppression controller 411 is configured to receive the digital transmit signal by branch 412 and is configured to, on detection of a transition between the first logic level and the second logic level in the digital transmit signal (e.g. logic low to logic high), that requires the transition from the first differential state to the second differential state, activate the suppression element 409 for a predetermined time. The suppression element 409 may take the form of a feed forward signal improvement transceiver. It may be known how quickly the suppression element 409 is able to drive the bus to the second differential state and therefore activation for a predetermined period of time may provide a convenient way of applying the differential signalling to the bus. In one or more examples, at the end of the predetermined time, the suppression controller 411 is configured to deactivate the suppression element 409, such as until the next transition between logic states in the digital transmit signal that requires the transition from the first differential state to the second differential state. The predetermined time should be less than the bit time of the logic levels and less than the time the resistor(s) 410 would take to drain the energy from the bus.

It will be appreciated that in other examples the disabling of the suppression element 409 may be based on detection of the second differential state being reached. Accordingly, a sensor (not shown) may be provided at the bus terminals to sense the potential difference between the at least two bus wires.

In this and other examples, the suppression element 409 is configured to decrease the potential difference between the at least two wires of the bus towards the second differential voltage state by application of a potential difference to the at least two bus wires of an opposite polarity to that applied by the first transmitter 408 to achieve the first differential voltage state. The transmitter arrangement 406 may be configured to disable the suppression element when the second differential state is reached using the sensor or predetermined time, for example. The suppression element 409 may comprise a further transmitter. The transmitters may be provided by arrangements of transistors, as will be known to those skilled in the art. In other examples not illustrated herein, the suppression element may comprise a further resistor that may be switched to couple the bus wires together or to be disconnected from the bus.

Accordingly, in one or more examples, the transmitter arrangement is configured to signal a transition from the second logic level to the first logic level, logic low, by activating the first transmitter 408 to provide the potential between the bus wires as shown at 506, 507 and by not activating the suppression element. The first transmitter 408 therefore provides the differential signalling to achieve and maintain the first differential state against the effect of the resistors 410, which passively drain energy from the bus. Further, in one or more examples, the transmitter arrangement is configured to signal a transition from the first logic level to the second logic level, logic high, by deactivating the first transmitter 408 and by activating the suppression element 409 for the predetermined time. The suppression element 409 may then be deactivated before the end of the bit time for said second logic level.

It will be appreciated that to maintain the first logic level during the next bit time the first transmitter 408 remains active. It will also be appreciated that to maintain the second logic level during the next bit time the first transmitter 408 remains deactivated and there is no need to activate the suppression element 409 because the second differential state is already achieved.

Example FIG. 6 shows a CAN node 600 and the same reference numerals as used in FIG. 4 have been used for like parts. FIG. 6 shows the controller 601 coupled to the CAN transceiver 400 by a first connection and a second connection that respectively couple the transmit input 407 and the receive output 405 to transfer the digital transmit signal and digital receive signal between the controller 601 and the transceiver 400.

The controller 601 comprises a protocol controller 602 that implements the CAN-based protocol. It will be appreciated that reference to the CAN protocol may refer to the original CAN protocol or the extensions thereto, such as CAN FD (ISO11898-1:2015) and the proposed CAN XL.

It will be appreciated that the network of FIG. 3 may be provided in an uncoupled form for installing in a device, such as an automobile or other machine. Accordingly, a kit of parts may be provided for forming a differential bus network. The kit comprises a bus comprising at least two bus wires, which may be in the form of a harness for routing around the automobile. The kit may include at least three nodes, wherein each of the at least three nodes comprise a transceiver comprising bus terminals for coupling, respectively, to the at least two wires of the bus and a receiver arrangement configured to receive differential signalling from the bus terminals and determine a digital receive signal based on said differential signalling; and a transmitter arrangement configured to apply differential signalling to the bus terminals based on a digital transmit signal, the transmitter arrangement comprising a first transmitter element configured to increase the potential difference between the at least two wires of the bus to a first differential voltage state and maintain the first differential state and a second transmitter configured to decrease the potential difference between the at least two wires of the bus towards a second differential voltage state, the transmitter arrangement further comprising a resistor coupled between the bus terminals configured to at least maintain the second differential voltage state.

The kit may further include one or more controllers 601 for coupling with the transceivers 400.

Figure 7:
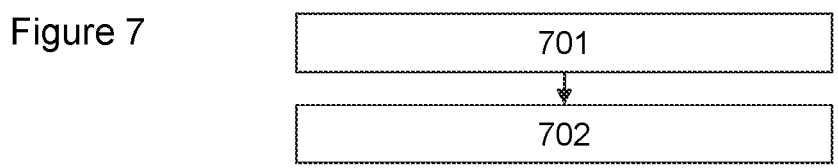
FIG. 7 shows an example flow chart illustrating a method of the disclosure.

FIG. 7 shows an example method of forming a differential bus network, the method comprising:
  providing 701 a bus comprising at least two bus wires;
  coupling 702 at least three nodes to said bus, wherein each of the at least three nodes comprise a common transceiver design in terms of each transceiver comprising bus terminals for coupling, respectively, to the at least two wires of the bus; and
  a receiver arrangement configured to receive differential signalling from the bus terminals and determine a digital receive signal based on said differential signalling; and
  a transmitter arrangement configured to apply differential signalling to the bus terminals based on a digital transmit signal, the transmitter arrangement comprising a first transmitter element configured to increase the potential difference between the at least two wires of the bus to a first differential voltage state and maintain the first differential state and a second transmitter configured to decrease the potential difference between the at least two wires of the bus towards a second differential voltage state, the transmitter arrangement further comprising a resistor coupled between the bus terminals configured to at least maintain the second differential voltage state.

When forming a differential bus network a preestablished protocol may be adhered to, wherein the protocol may define one or more of a physical specification of components of the differential bus network, minimum performance requirements, timing requirements, voltage level requirements, message frame format and other factors. In particular, the protocol may define a minimum impedance of the bus, and the method may include determining the resistance of the resistor of each of said at least three nodes wherein the resistor has a resistance, in Ohms, greater than the minimum impedance of the bus multiplied by one of: the number of at least three nodes or a maximum number of nodes that the bus of the network is configured to couple to. Thus, once the resistance is determined, the nodes may be configured such that the resistor has said determined resistance. It will be appreciated that as nodes are added to the bus, the resistors are connected in parallel, which reduces the overall impedance of the bus and therefore, accordingly, the network may have a limit to the number of nodes that are permitted to couple to it.

The method may further include coupling a controller 601 that implements the communication protocol, such as CAN or FlexRay, to one or each of the transceivers.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:
1. A differential bus network comprising:
  a bus comprising at least two bus wires;
  at least three nodes, wherein each of the at least three nodes comprise:
    a transceiver comprising:
      bus terminals for coupling, respectively, to the at least two wires of the bus;

a receiver arrangement configured to receive differential signalling from the bus terminals and determine a digital receive signal based on said differential signalling; and a transmitter arrangement configured to apply differential signalling to the bus terminals based on a digital transmit signal, the transmitter arrangement comprising a first transmitter configured to increase the potential difference between the at least two wires of the bus to a first differential voltage state and maintain the first differential state and a suppression element configured to decrease the potential difference between the at least two wires of the bus towards a second differential voltage state, the transmitter arrangement further comprising a resistor coupled between the bus terminals configured to at least maintain the second differential voltage state.

2. The differential bus network of claim 1, wherein the bus comprises a Controller Area Network, CAN, bus and wherein the transceiver of each of said at least three nodes is configured to provide the digital receive signal to, and receive the digital transmit signal from, a CAN protocol controller.

3. The differential bus network of claim 2, wherein each node include a controller that includes a CAN protocol controller to implement a CAN-based protocol in the network, the controller coupled to the transceiver by at least a first connection to provide the digital transmit signal to the transceiver and a second connection to receive the digital receive signal from the transceiver.

4. The differential bus network of claim 1, wherein the configuration of the differential bus network is defined by a protocol and wherein the protocol defines a minimum impedance of the bus and wherein the resistor may have a resistance, in Ohms, greater than the minimum impedance of the bus multiplied by one of:
the number of at least three nodes; or
a maximum number of nodes that the bus of the network is configured to couple to.

5. The differential bus network of claim 1, wherein the network comprises only said at least three nodes.

6. The differential bus network of claim 1, wherein the resistor comprises a discrete resistor coupled between the bus terminals downstream of the transmitter arrangement and upstream of the receiver arrangement.

7. The differential bus network of claim 1, wherein the first differential state comprises the provision of a potential difference between the at least two bus wires greater than a threshold voltage to signal a bit of the digital transmit signal of a first logic level, and the second differential state comprises the provision of a substantially zero potential difference between the at least two bus wires that is less than said threshold voltage to signal a bit of a second logic level, different to the first logic level.

8. The differential bus network of claim 7, wherein the transceiver is configured to provide said differential signalling representing the first logic level by activating the first transmitter and configured to provide said differential signalling representing the second logic level by, in part, deactivating the first transmitter.

9. The differential bus network of claim 7, wherein the transceiver includes a suppression controller configured to receive the digital transmit signal and configured to, on detection of a transition between the first logic level and the second logic level in the digital transmit signal, that requires the transition from the first differential state to the second differential state, activate the suppression element for a predetermined time.

10. The differential bus network of claim 1, wherein the suppression element is configured to decrease the potential difference between the at least two wires of the bus towards the second differential voltage state by application of a potential difference to the at least two bus wires of an opposite polarity to that applied by the first transmitter to achieve the first differential voltage state, the transmitter arrangement configured to disable the suppression element when the second differential state is reached.

11. An electronic device including the differential bus network of claim 1.

12. A kit of parts for forming a differential bus network, the kit comprising:
a bus comprising at least two bus wires;
at least three nodes, wherein each of the at least three nodes comprise:
bus terminals for coupling, respectively, to the at least two wires of the bus;
a transceiver comprising:
a receiver arrangement configured to receive differential signalling from the bus terminals and determine a digital receive signal based on said differential signalling; and
a transmitter arrangement configured to apply differential signalling to the bus terminals based on a digital transmit signal, the transmitter arrangement comprising a first transmitter element configured to increase the potential difference between the at least two wires of the bus to a first differential voltage state and maintain the first differential state and a second transmitter configured to decrease the potential difference between the at least two wires of the bus towards a second differential voltage state, the transmitter arrangement further comprising a resistor coupled between the bus terminals configured to at least maintain the second differential voltage state.

13. A method of forming a differential bus network, the method comprising:
providing a bus comprising at least two bus wires;
coupling at least three nodes to said bus, wherein each of the at least three nodes has bus terminals for coupling, respectively, to the at least two wires of the bus and a common transceiver design in terms of the transceiver comprising:
a receiver arrangement configured to receive differential signalling from the bus terminals and determine a digital receive signal based on said differential signalling; and
a transmitter arrangement configured to apply differential signalling to the bus terminals based on a digital transmit signal, the transmitter arrangement comprising a first transmitter element configured to increase the potential difference between the at least two wires of the bus to a first differential voltage state and maintain the first differential state and a second transmitter configured to decrease the potential difference between the at least two wires of the bus towards a second differential voltage state, the transmitter arrangement further comprising a resistor coupled between the bus terminals configured to at least maintain the second differential voltage state.

14. The method of claim 13, wherein the configuration of the differential bus network is defined by a protocol and wherein the protocol defines a minimum impedance of the bus, and the method includes determining the resistance of the resistor of each of said at least three nodes wherein the resistor has a resistance, in Ohms, greater than the minimum impedance of the bus multiplied by one of: the number of at least three nodes or a maximum number of nodes that the bus of the network is configured to couple to.

15. The method of claim 13, wherein the method comprises coupling a respective controller to one or more of the transceivers of the at least three nodes, each respective controller configured to provide said digital transmit signal to the transceiver and receive the digital receive signal from the transceiver.

* * * * *